United States Patent
Yoshizawa

(10) Patent No.: US 7,570,581 B2
(45) Date of Patent: Aug. 4, 2009

(54) DYNAMIC REDUCTION OF ROUTE RECONVERGENCE TIME

(75) Inventor: Takahito Yoshizawa, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 529 days.

(21) Appl. No.: 10/947,689

(22) Filed: Sep. 23, 2004

(65) Prior Publication Data

US 2006/0062199 A1 Mar. 23, 2006

(51) Int. Cl.
*G01R 31/08* (2006.01)

(52) U.S. Cl. .................. 370/218; 370/245; 709/239

(58) Field of Classification Search ......... 370/216–218, 370/221–228, 230, 231, 235, 237, 395.2, 370/242–245, 248; 375/224, 225; 709/239; 714/47–49
See application file for complete search history.

(56) References Cited

U.S. PATENT DOCUMENTS

| | | | |
|---|---|---|---|
| 5,583,792 A | 12/1996 | Li et al. | |
| 5,764,651 A * | 6/1998 | Bullock et al. | 714/708 |
| 5,822,301 A | 10/1998 | Arnold et al. | |
| 6,141,532 A | 10/2000 | Mizuike et al. | |
| 6,304,556 B1 | 10/2001 | Haas | |
| 6,310,911 B1 * | 10/2001 | Burke et al. | 375/224 |
| 6,424,629 B1 * | 7/2002 | Rubino et al. | 370/241.1 |
| 6,594,268 B1 | 7/2003 | Aukia et al. | |
| 6,614,765 B1 | 9/2003 | Bruno et al. | |
| 6,654,923 B1 * | 11/2003 | Grenier et al. | 714/752 |
| 6,714,896 B1 * | 3/2004 | Barrett | 702/189 |
| 6,766,309 B1 | 7/2004 | Cheng et al. | |
| 6,915,463 B2 * | 7/2005 | Vieregge et al. | 714/704 |
| 7,006,441 B1 * | 2/2006 | Choudhury et al. | 370/236 |
| 2002/0145981 A1 | 10/2002 | Klinker et al. | |
| 2003/0120983 A1 * | 6/2003 | Vieregge et al. | 714/708 |
| 2003/0202511 A1 * | 10/2003 | Sreejith et al. | 370/389 |
| 2005/0036452 A1 * | 2/2005 | Banerjee et al. | 370/252 |

FOREIGN PATENT DOCUMENTS

| | | | |
|---|---|---|---|
| EP | 1083706 A2 * | 3/2001 | |
| EP | 1318648 A2 * | 6/2003 | |

OTHER PUBLICATIONS

Hundessa, L et al., "Reliable and Fast Rerouting Mechanism for a Protected Label Switched Path," IEEE Global Telecommunications Conference, 2002. Globecom '02. Nov. 17-21, 2002. vol. 2. pp. 1608-1612.*

* cited by examiner

*Primary Examiner*—Donald L Mills

(57) ABSTRACT

A router (101, 103, 105) includes a communication interface, for receiving a packet (107a-107f), when connected to a communication network. The router (101, 103, 105), for example with a processor, for calculating an alternate path for routing a packet (107a-107f) received from the communication interface while awaiting a determination that a pre-determined path for the packet has failed. According to one or more embodiments, the router (101, 103, 105) can facilitate calculating an alternate path for routing the packet (107a-107f) received from the communication interface while awaiting a first determination that a pre-determined path for the packet has failed and/or a second determination that the pre-determined path is likely to fail. Further in accordance with one or more embodiments, the router (101, 103, 105) can predict a behavior of network element(s) in a route topology, wherein the network element(s) is included in a pre-determined path for routing the packet received from the communication interface.

16 Claims, 3 Drawing Sheets

DYNAMIC REDUCTION OF ROUTE RECONVERGENCE TIME

FIELD OF THE INVENTION

The present invention relates in general to wireless communication units and wireless networks, and more specifically to dynamic determination of route reconvergence utilized in communication networks.

BACKGROUND OF THE INVENTION

A router in a communication network, upon receiving a packet, can read the packet's routing information, select a route, and then forward the packet to a next router in the route. The router has collected information about routes on the network that can be used to perform route selection when forwarding packets. When the router detects a failure of a neighboring router in a current route topology, a reconvergence of the route topology occurs, in, e.g., link-state routing protocols, for example, open shortest path first (OSPF) and intermediate system to intermediate system (IS-IS).

Reconvergence includes a process in which the router selects an alternative path to the destination networks that are affected by the failure. Reconvergence conventionally is a three step process performed by the router, which includes the following: (1) detection of the actual failure; (2) re-calculation of the route topology utilizing topology information, to obtain an alternative route to the destination in the routing information; and (3) updating the routing table in the router. Conventionally, these three steps occur in a sequential manner. Consequently, the total time of reconvergence is the sum of time for each of these steps.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION

Figure 1:
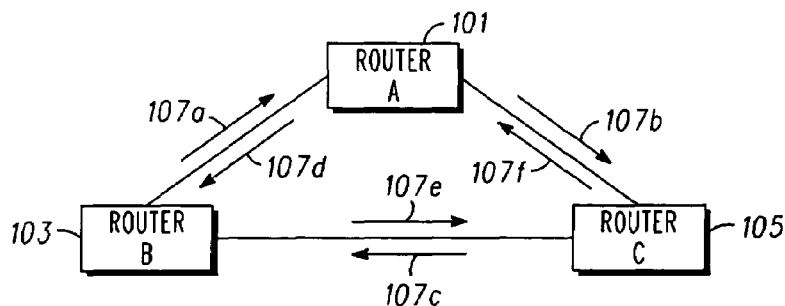
FIG. 1 is a diagram illustrating simplified and representative devices for transmitting and receiving packets in an exemplary communication network in accordance with various exemplary embodiments.

In overview, the present disclosure concerns communication systems, such as an Enterprise Network, a cellular Radio Access Network, or the like, often associated with, e.g., wireless communications devices or units, often referred to as communication units, such as cellular phone or two-way radios and the like having the ability to send and/or receive communications, associated with a communication system. Such communication systems may further provide services such as voice and data communications services. More particularly, various inventive concepts and principles are embodied in communication systems, portions thereof, and methods therein for determining a route for a packet associated with a call to a communication unit over a communication network.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation in communication networks.

The communication systems and communication units of particular interest are those providing or facilitating voice, other audio, video and/or other image communications services or data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore or alternatively the wireless communication units or devices of interest may have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes and/ or steps, which can be performed in any order, unless expressly and necessarily limited to a particular order; i.e. processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed herein below, various inventive principles and combinations thereof are advantageously employed to reduce a time for network reconvergence. One or more embodiments utilize a feedback from neighboring routers. A router on the communication network monitors the behavior of a neighboring router in the communication network route to confirm whether the neighboring router is in communication. For example, a conventional "hello" message can be periodically expected from the neighboring router, or a physical connection can be confirmed. Considering information including the past history of a pattern of behavior of the router in connection with confirming the communication connection, a behavior of the neighboring router for confirming communication connection can be predicted and a time utilized in route reconvergence can be reduced.

According to exemplary embodiments and alternative exemplary embodiments, a conventional "hello" message is received periodically from the neighboring router, and can be stored, e.g., in a history, together with any other relevant information, e.g., information concerning the time of arrival. From this history, information reflecting the accuracy of the neighbor router, such as average time between two "hello" messages, jitter (i.e., variation of period between two "hello" messages), and/or standard deviation from the average can be determined. With this information, the router can predict a reasonable expected maximum wait time, after which the neighboring router (or the path thereof) can be determined to have failed or at least that it is likely to have failed. The maximum wait time indicates a time period which is sufficiently long for the router to receive, e.g., the next "hello" message from the particular neighboring router.

The router can maintain this information for each neighbor to which it is connected. Wait time can be different from one neighbor router to another, and/or can fluctuate over time. For example, if one neighbor router has a past history of very accurate transmission of "hello" messages with very low deviation from the mean time period, the chance of this router still being alive after not receiving one "hello" message for a long time period beyond the average time is rather low. On the other hand, if another router has a past history of very inaccurate and fluctuating "hello" message transmissions, the chance of this router still being alive after not receiving one "hello" message for the same time period is likely to be higher.

In accordance with exemplary embodiments, and alternative exemplary embodiments, the neighbor router failure detection and subsequent route reconvergence can be carried out based on the observed behavior of the routers in a past history, e.g., timing of "hello" messages over a sample period. The conventional failure detection technique calls for a fixed timer period configured on the router, e.g., router_dead_timer in OSPF (open shortest path first) protocol; after the fixed timer period expires without a connection confirmation, e.g., a "hello" message, the neighbor router is deemed to be or have failed and reconvergence occurs to exclude the failed router (or the path with the failed router). Detecting a router failure based on observed behavior allows a more accurate detection of true onset of failure. A shorter network reconvergence can permit faster re-routing of packets. Rapid reconvergence can be desirable for packet traffic that can carry data sensitive to timely continuity, e.g., voice over internet protocol (VoIP), other audio communications, video communications and/or other image communications.

In accordance with one or more embodiments, when the router detects that a timer based on observed behavior has expired for a neighbor router, the router can be considered likely to have failed. The router can begin a topology recalculation of a new route before the conventional router dead interval expires. Advantageously, the router can be ready to install the new route, having been calculated, immediately after the dead interval expires. In this way, the failure detection and the re-determination of topology information and selection of the new route can be overlapped.

In accordance with conventional techniques for link state routing protocols, the neighbor router dead interval is determined by a pre-configured static time period. For example, the router_dead_timer in the OSPF protocol can be specified by an operator.

According to one or more embodiments, e.g., utilizing an OSPF protocol, upon expiration of the router dead interval, the router sends the conventional link state update (LSU) information to its neighbors to inform them of the change in the network topology, thereby causing further conventional shortest path first (SPF) calculations.

A time period over which the history is kept can be configurable, in accordance with one or more embodiments. The history of behaviors can begin with, e.g., a conventional initial neighbor discovery.

The following observations may be considered when determining the collection of behaviors and the wait time for a neighbor router: (1) the larger the number of samples, the higher the confidence of the derived value; (2) the lower the value of standard deviation, the higher the confidence of the derived value; and (3) the derived time period advantageously is shorter than the router dead interval, in order to achieve desired time savings.

The following formula, provided as an example, can assist in characterizing the properties mentioned above, and can be utilized in connection with one or more embodiments:

$$\text{MaxWaitTime}(x) = (\text{Avg}(x) * (1 + \text{Dev}(x)/\text{Avg}(x))) * ((N(x)+1)/N(x))$$

Where $X$=router X.

$N(x)$=number of past "hello" messages received from router X from the beginning of the measurement period.

Avg(x)=average time period between two "hello" messages from router X over the sample period.

Dev(x)=standard deviation of the "hello" messages received for router X over the sample period.

Further in accordance with exemplary embodiments, a router and method therefore are provided in order to reduce a reconvergence time in a communication network. In accordance with one or more embodiments, a process of re-determining a route topology can be overlapped with a process of awaiting a failure determination with respect to a neighbor router in the path. Further, in accordance with one or more embodiments, a time utilized in connection with a determination that a pre-determined path on the router has failed (or is likely to have failed) can be determined dynamically. In exemplary and alternative exemplary embodiments, the overlapping and the dynamic determining of the time can be utilized together.

Referring now to FIG. 1, dynamic determination of router failure time will be discussed and described. FIG. 1 is a diagram illustrating simplified and representative devices for transmitting and receiving packets in an exemplary communication network 109 in accordance with various exemplary embodiments. An exemplary communication network 109, simplified for illustration, includes first router A 101, second router B 103 and third router C 105. Communication packets 107a-f can be transmitted between neighboring routers. The first router 101 on the communication network 109 can monitor the behavior of neighboring second router B 103 and third router C 105 in the communication network route 109, e.g., to confirm whether the neighboring router 103, 105 is in communication or available for communication. Conventional "hello" messages 107a, 107f can be periodically expected to be received by the first router A 101 from the second router B 103 and the third router C 105. Similarly, "hello" messages 107b, 107d can be expected to be periodically transmitted from the first router A 101 to the neighbor routers A, B 103, 105, in order to confirm the connection or availability of a connection. In this simplified illustration, the second router B 103 and the third router C 105 also exchange "hello" messages 107c, 107e. Packets, e.g., the "hello" messages, can be exchanged in accordance with known techniques, for example, utilizing communication interfaces on the routers and in accordance with relevant networking protocols.

Considering now the first router A 101, for example, one or more embodiments can provide that the calculation of a new route and the time awaiting the dead interval timer can be overlapped somewhat, if not entirely. Accordingly, the first router A 101 can be configured to facilitate calculating an alternate path in the communication network 109 for routing a packet received utilizing the communication interface while awaiting a determination that a pre-determined path for the packet has failed. The calculation of the alternate path in the communication network 109 can be performed in accordance with known techniques, utilizing for example known re-convergence techniques that omit the failed path. The determination that a pre-determined path for the packet is or is deemed to have failed can be made in accordance with known techniques. For example, in accordance with or more embodiments, a conventional dead interval timer can be utilized; upon expiration of the dead interval timer without a "hello" message from the neighbor second router B 103 or third router C 105 (whichever is in the route), the neighbor router is deemed to be failed.

In accordance with one or more embodiments, the router itself can be configured to determine that the neighbor router and/or the path, pre-determined in accordance with the route topology, has failed. In accordance with exemplary and alternative exemplary embodiments, the router can determine that the path has failed, for example by observing, detecting, or receiving an expiration of the conventional dead interval timer.

One or more embodiments provide that the alternate path is calculated after a delay and/or upon occurrence of certain situations, for example, upon determining that the path is likely to be failed. A determination of likely failure of the path is discussed in detail below.

In accordance with exemplary embodiments and alternative exemplary embodiments, the pre-determined path including a network element, e.g., the neighboring router, can be determined to be likely to be failed based at least in part on prior behaviors of the network element. For example, conventional "hello" messages are received by the first router A 101 from, e.g., the neighboring second router B 103, together with information concerning the time of arrival. The information reflects a history of prior behaviors. From the behaviors of the second router B 103, information reflecting the accuracy of periodic transmission of messages, e.g., as average time between messages, jitter (i.e., variation of period between two "hello" messages), and/or standard deviation from the average can be determined. Information reflecting accuracy can be calculated in accordance with known techniques, e.g., known standard deviation and/or other statistical techniques. With this information, the first router A 101 can predict a reasonable expected maximum wait time with respect to the second router B 103, indicating a period which is normally long enough for the first router A 101 to receive the next message, e.g., "hello" from the second router B 103. After the reasonable expected maximum wait time expires without a "hello" message, the second router B 103 can be determined to be likely to be failed.

Advantageously, the behaviors can be collected from one or more network elements, e.g., routers, which are adjacent to the first router A 101 according to a route topology that is currently utilized by the first router A 101. The route topology can change, e.g., routers can be added and/or removed. Hence, the network elements that are monitored for inclusion of behaviors can be added and/or removed from the history of past behaviors. A router can be added and/or removed from the route topology in accordance with conventional procedures, and hence such procedures will not be detailed further herein.

Optionally, the information regarding the prior behaviors can be collected over a period of time, e.g., a pre-defined window of time, or a pre-determined number of actions. Prior behaviors can be stored as information in a history, e.g., in a table. Optionally, prior behaviors can be accumulated and/or aggregated.

Specific behaviors observed by the first router A 101 can include, e.g., an action taken by the network element, a performance of the network element on the route, and an accuracy of the network element. In accordance with one or more exemplary and alternative exemplary embodiments, behaviors can include, e.g., the performance observed with respect to the neighbor router (e.g., a time of arrival of a message), the action observed with respect to the neighbor router (e.g., a "hello" message), and/or an accuracy with respect to the neighbor router (e.g., standard deviation for timing of messages). Accuracy can be derived from information in the history including, e.g., prior messages. A time after which the neighbor router is likely to be failed can be determined based on the information in the history. For example, a maximum time for response for a particular neighbor router can include an average response time plus one or more standard deviations. After such maximum time for response expires, the neighbor router is likely to have failed.

The calculation of an alternate path for routing the packet can include calculating a route topology, where the route topology omits the neighbor in the pre-determined path that is determined to likely have failed. The calculation of the alternate path can be performed in accordance with known techniques.

In accordance with one or more embodiments, the first router A 101 can calculate an alternate path for routing a packet received utilizing the communication interface, while awaiting a first determination that a pre-determined path for the packet has failed, and/or a second determination that the pre-determined path is likely to fail. The path can correspond to a destination, for example, and thus one or more routes and paths in the routes can be appropriate. The determination that the path has failed has been previously discussed in detail. The determination that the path is likely to have failed has similarly been discussed in detail above.

A process overlapping the determination and the calculation (mentioned just above) can be advantageous in situations including, for example, communications where timely arrival of packets is desirable (often noted as time sensitive or time critical), e.g., voice, other audio, video and/or other image communications, where the communication including the packet can be supported over the pre-determined path and the alternate path. The reduction of time to re-route a packet can increase the quality of the voice, other audio, and video communication by, for example, avoiding or eliminating undue blanks or voids in such communications.

In accordance with one or more embodiments, the router can dynamically determine a router failure time. The first router A 101 can predict a behavior of one or more network elements, e.g., routers such as second router B 103, in a route topology, wherein the network element(s), e.g., second router B 103 can be included in a pre-determined path for routing a packet received by the first router A 101, e.g., utilizing a communication interface. Exemplary illustrations of predicting the behavior have been discussed previously in detail. According to exemplary embodiments, the first router A 101 itself, e.g., a processor therein, can be configured to facilitate determining whether the pre-determined path has failed.

Advantageously, the behavior that is predicted can be a failure of the network element(s). In accordance with one or more embodiments, the route topology can be re-determined, in response to a prediction that failure is likely. The re-determined route topology can exclude the network element(s) that are likely to have failed, e.g., responsive to predicting the failure.

Figure 2:
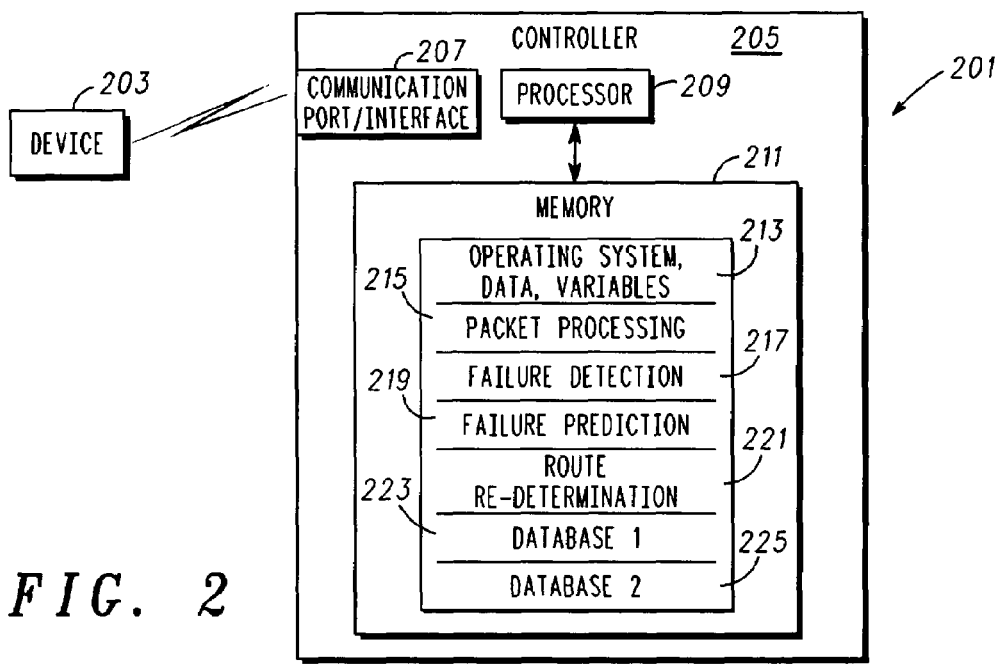
FIG. 2 is a block diagram illustrating portions of an exemplary router of a communication network in accordance with various exemplary embodiments.

Referring now to FIG. 2, an exemplary router of a communication network will be discussed and described. FIG. 2 is a block diagram illustrating portions of an exemplary router of a communication network in accordance with various exemplary embodiments.

FIG. 2 is a block diagram of an exemplary router 201 for use in operation of one or more embodiments. The communication device router 201 may include one or more controller 205s, one or more communication interfaces or ports 207 for communication with other network elements, routers, or devices 203 over a communication network, one or more processors 209, and one or more memories 211.

The processor 209 may comprise one or more microprocessors and/or one or more digital signal processors and/or one or more ASICs (application specific integrated circuits). The memory 211 is coupled to the processor 209 and may comprise a read-only memory (ROM), a random-access memory (RAM), a programmable ROM (PROM), an electrically erasable read-only memory (EEPROM), and/or magnetic memory or the like. The memory 211 may include multiple memory locations for storing, inter alia, an operating system, data and variables 213 for programs executed by the processor 209; computer programs for causing the processor to operate in connection with various functions such as packet processing 215, failure detection 217, failure prediction 219, route re-determination 221, and/or other processing (not illustrated); a database 223 of, e.g., information concerning routes and/or history information; and a database 225 for other information used by the processor 209. The computer programs may be stored, for example, in ROM, PROM, etc. and may direct the processor 209 in controlling the operation of the router 201.

The processor 209 may be programmed to store and/or forward packets to other routers on the communication network, e.g., utilizing communications over the communication port 207. Conventional techniques are known for use in connection with receiving and transmitting packets over the communication network. Responsive to instructions stored in memory 211, or automatically upon receipt of certain information, e.g., a packet, utilizing the communication port 207, the processor 209 may direct communication packets, to, e.g., other routers on the communication network.

Figure 3:
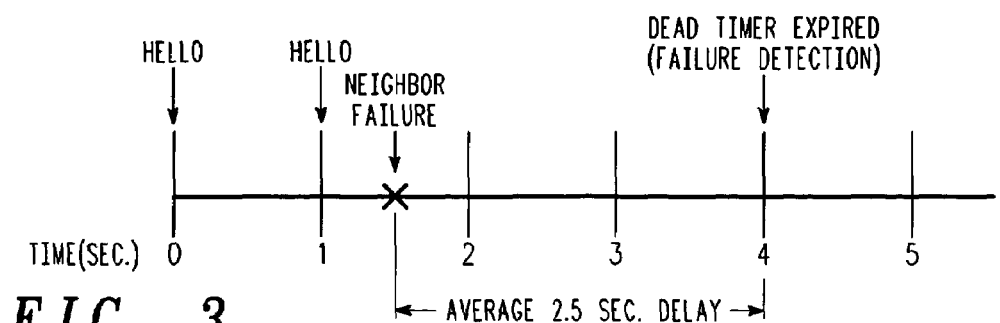
FIG. 3 is a timing diagram illustrating detection of failure of a router of a communication network, in accordance with various exemplary embodiments.
Figure 4:
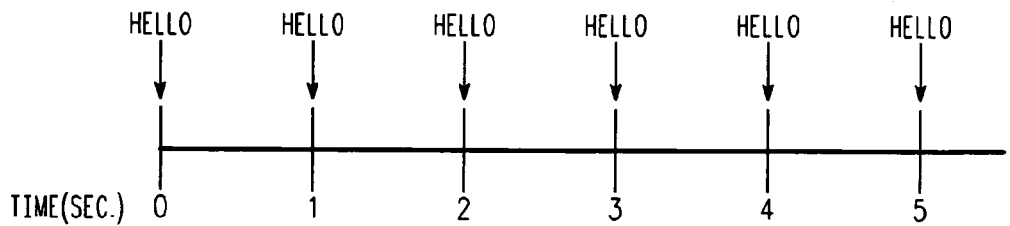
FIG. 4 is a timing diagram illustrating an exemplary pattern of accurate communications detected on a communication network, in accordance with various exemplary embodiments.
Figure 5:
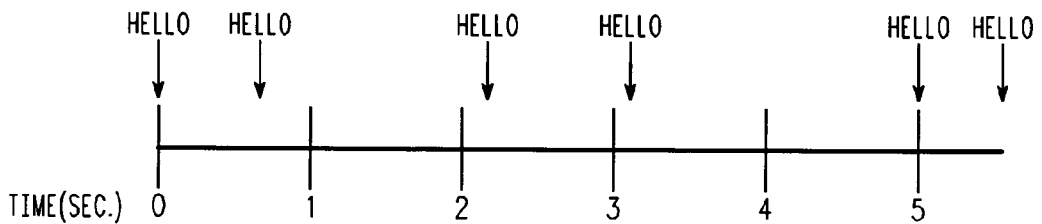
FIG. 5 is a timing diagram illustrating an exemplary pattern of inaccurate communications detected on a communication network, in accordance with various exemplary embodiments.

FIG. 3, FIG. 4, and FIG. 5 present timing diagrams to illustrate exemplary detection of router failure, and hence path failure (FIG. 3), and prediction of router failure (FIG. 4, FIG. 5), in accordance with one or more embodiments.

Referring now to FIG. 3, detection of router failure will be discussed and described. FIG. 3 is a timing diagram illustrating an example detection of failure of a router of a communication network, in accordance with various exemplary embodiments. A router can monitor incoming "hello" messages from a particular neighbor router over time, e.g., T(sec). In the illustration, an exemplary router receives exemplary "hello" messages at 0 seconds and 1 second. The neighbor router actually fails in this example between 1 and 2 seconds, and consequently no further "hello" messages are received by the router. In the present example, the dead interval timer is set to 3 seconds, for example, by an operator configuring the router, and is intended to reflect a maximum time in all situations permitted between "hello" messages. The failure of the path is detected at expiration of the dead interval timer, in this example, at four seconds after the first "hello" message. The router detection failure has been previously discussed in connection with various exemplary embodiments. Router detection failure can advantageously be implemented in connection with, e.g., the router discussed for example in connection with FIG. 2.

Referring now to FIG. 4, one or more examples illustrating a first prediction of router failure will be discussed and described. FIG. 4 is a timing diagram illustrating an exemplary pattern of accurate communications detected on a communication network, in accordance with various exemplary embodiments. In the present example, FIG. 4 exhibits greater accuracy than, e.g., the router discussed in connection with FIG. 5 (below). A router monitors incoming "hello" messages from a particular neighbor router over time, e.g., T(sec). In the illustration, an exemplary router receives exemplary "hello" messages at intervals of approximately one second. The prediction of the likely behavior of the router has been previously discussed in connection with various exemplary embodiments. Consider, for example, that the average interval between an arrival of "hello" messages is 1.05 seconds, with a standard deviation of 0.05 seconds. In accordance with one or more embodiments, an interval for determining that the router is likely to have failed is 1.1 seconds, derived (in this exemplary embodiments) by adding the average interval between arrivals with the standard deviation for the behaviors in the history information. Router behavior prediction can advantageously be implemented in connection with, e.g., the router discussed for example in connection with FIG. 2.

Referring now to FIG. 5, one or more examples illustrating a second prediction of router failure will be discussed and described. FIG. 5 is a timing diagram illustrating an exemplary pattern of inaccurate communications detected on a communication network, in accordance with various exemplary embodiments. As in the prior example, the router monitors incoming "hello" messages from a particular neighbor router over time, e.g., T(sec). In the illustration, an exemplary router receives exemplary "hello" messages, sometimes at an interval of less than one second, sometimes at an interval approaching two seconds. In comparison with the example of FIG. 4 (illustrating an accurate pattern), FIG. 5 exhibits a pattern with much lower accuracy. The prediction of the likely behavior of the router has been previously discussed in connection with various exemplary embodiments. Consider, in this example, that the average interval between arrival of "hello" messages is 1.30 seconds, with a standard deviation of 0.50 seconds. In accordance with one or more embodiments, an interval for determining that the router is likely to have failed is 1.8 seconds, derived (in this exemplary embodiment) by adding the average interval with the standard deviation for the behaviors in the history. Router behavior prediction can advantageously be implemented in connection with, e.g., the router discussed for example in connection with FIG. 2.

The pattern of historical behavior for the router in the example of FIG. 4 is more accurate, and the pattern of historical behavior for the router in the example of FIG. 5 is less accurate. A predicted behavior for the router in the example of FIG. 4 is more strict or deterministic than for FIG. 5, and results in a shorter time for predicting likely failure. On the other hand, the predicted behavior for the router in the example of FIG. 5 is less strict than FIG. 4, with a longer time for predicting likely failure. In any event, the time for determining a likely failure according to the examples of FIG. 4 and FIG. 5 can be less than the time for determining an actual failure, e.g. 3 seconds or on average 2.5 seconds, according to the example of FIG. 3.

Figure 6:
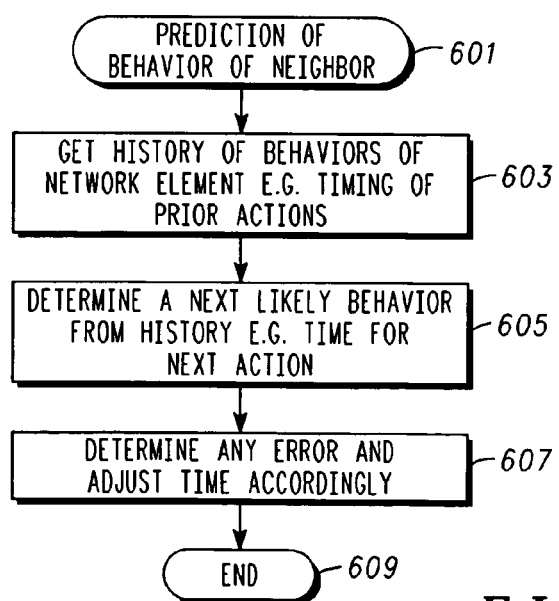
FIG. 6 is a flow chart illustrating an exemplary procedure for prediction of a behavior of a neighbor in a communication network, in accordance with various exemplary and alternative exemplary embodiments.

Referring now to FIG. 6, an example process for a prediction of the behavior of a neighbor, e.g., a next router in a communications network topology will be discussed and described. FIG. 6 is a flow chart illustrating an exemplary procedure for prediction of a behavior of a neighbor 601 in a communication network, in accordance with various exemplary and alternative exemplary embodiments. Advantageously, the procedure illustrated in FIG. 6 can be implemented, for example, on the processor illustrated in FIG. 2 or other suitable arranged apparatus.

The procedure provides for getting 603 a history of behaviors of the network element, e.g., the neighbor router according to the route topology. The history of behaviors has been previously discussed in detail. The history can be maintained in any appropriate means, e.g., memory, storage of a list, storage of a table, etc.

Having obtained the history, the procedure provides for determining 605 a next likely behavior of the neighbor router from the history, for example, a likely time when the network element (e.g., the neighbor router) will take the next action (e.g., send a "hello" message). Various exemplary embodiments and alternative exemplary embodiments may implement various known techniques and methodologies to accomplish a determination of a time for a next likely action. Exemplary processes for determining a next likely behavior, e.g., the time of a "hello" message, have been discussed above in more detail.

The exemplary procedure provides for determining 607 an error based, e.g., on the history of behaviors, and adjusting the time for the next action accordingly. For example, where the next likely behavior time reflects an average time, the time can be adjusted to accommodate a standard deviation. Various exemplary embodiments and alternative exemplary embodiments may implement various known techniques and methodologies to accomplish a determination of an appropriate adjustment of the time.

The procedure 609 can end, and in accordance with one or more embodiments, can return a value for further use, e.g., a predicted behavior of the neighbor. The predicted behavior of the neighbor can be utilized as discussed in detail above.

Figure 7:
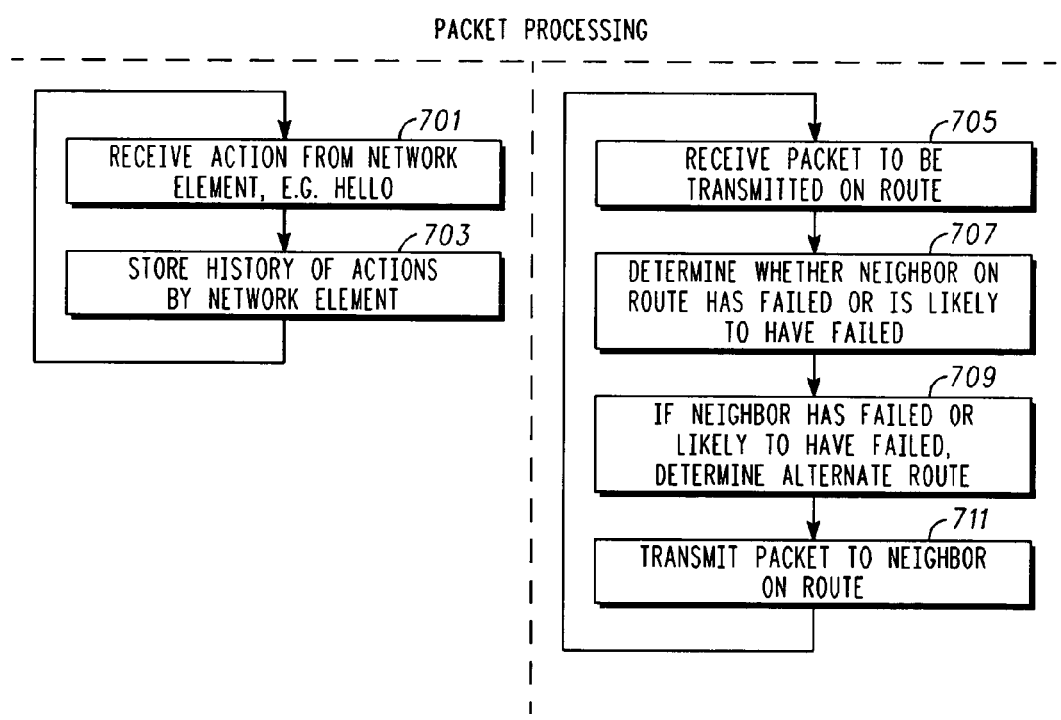
FIG. 7 is a flow chart illustrating exemplary portions of packet processing at a router, in accordance with various exemplary embodiments.

Referring now to FIG. 7, exemplary and simplified relevant portions of a processing of packets by a router on a communication network will be discussed and described. FIG. 7 is a flow chart illustrating exemplary portions of packet processing at a router, in accordance with various exemplary embodiments. Advantageously, the procedure illustrated in FIG. 7 can be implemented, for example, on the processor illustrated in FIG. 2. In the present exemplary illustration, first and second processes handle packets (e.g., "hello" packets) 701, 703 and packets for routing (e.g., communication packets) 705, 707, 709, 711. The two processes can run logically in parallel, although alternative implementations are possible.

A first process 701, 703 handles packets received. A relevant action 701 is received from a particular network element (e.g., a neighbor router), such as a "hello" message. The action 703 is stored in a history of actions by the particular network element, as described in greater detail previously. The first process loops to continue handling packets received 701.

A second process 705, 707, 709, 711 handles packet routing. The second process receives 705 a communication packet to be transmitted further along the communication network, utilizing a network element (e.g., a neighbor router) on a route.

The second process can determine 707 whether the neighbor on the route has failed and/or is likely to have failed. Processes and devices for determining failure or likely failure, and examples thereof, have been described previously in detail.

If the neighbor 709 has failed or is likely to have failed, the second process can determine an alternate route for the packet. Determining an alternate route has been described previously. The second process 711 can transmit the packet to the neighbor on the route. The neighbor can be the next network element in the route according to the original route topology, or if the route was re-determined, can be the next network element in the re-determined route topology.

The second process can loop to continue handling packets received 705.

While much of the balance of this disclosure describes, for example, various uses of the "hello" message, one of skill in the art will appreciate that the same advantages can be achieved and that the same principles can be applied, for example, to messages, communications, and other means of conveying information and/or status of a neighbor, in addition to the conventional "hello" message described in the examples and alternative examples utilized above to illustrate various principles.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A router, comprising:
   a communication interface, for receiving a packet, when operably connected to a communication network; and
   a processor, configured to facilitate calculating an alternate path for routing the packet received from the communication interface while awaiting a determination that a pre-determined path for the packet has failed based on at least a plurality of prior behaviors of the network element wherein the prior behaviors include measuring an average interval and a standard deviation of hello message received from a network element that is adjacent the router according to a route topology.

2. The router of claim 1, wherein the processor is further configured to facilitate the determination that the pre-determined path has failed.

3. The router of claim 1, wherein the processor is further configured to facilitate determining whether the pre-determined path is likely to be failed.

4. The router of claim 3, wherein the calculating is responsive to the determination that the pre-determined path is likely to be failed.

5. The router of claim 1, wherein the plurality of prior behaviors are detected over a pre-determined time period.

6. The router of claim 1, wherein the behaviors include at least two of an action of the network element, a performance of the network element, and an accuracy of the network element.

7. The router of claim 1, wherein the calculation further comprises calculating a route topology that omits a neighbor in the pre-determined path.

8. A router, comprising:
   a communication interface, for receiving a packet, when operably connected to a communication network; and
   a processor, configured to facilitate calculating an alternate path for routing the packet received from the communication interface while awaiting at least one of a first determination that a pre-determined path for the packet has failed and a second determination that the pre-determined path is likely to fail wherein the determination that the pre-determined path is likely to fail being based on at least a plurality of prior behaviors of the network element wherein the prior behaviors include measuring an average interval and a standard deviation of hello message received from the network element that is adjacent the router according to a route topology.

9. The router of claim 8, wherein the processor is further configured to facilitate the at least one of the first determination and the second determination.

10. The router of claim 8, wherein the processor is further configured for utilization in connection with at least one of audio communications and image communications including the packet over the pre-determined path and the alternate path.

11. A router, comprising:
    a communication interface, for receiving a packet, when operably connected to a communication network; and
    a processor, configured to facilitate predicting a behavior of at least one network element in a route topology, wherein the at least one network element is included in a pre-determined path for routing the packet received from the communication interface wherein the behavior is a failure of the at least one network element and wherein the behavior includes measuring the average interval and a standard deviation of hello message received from the network element.

12. The router of claim 11, wherein the processor is further configured to facilitate determining whether the pre-determined path has failed.

13. The router of claim 11, wherein the processor is further configured to facilitate re-determining the route topology to exclude the at least one network element, responsive to predicting the failure.

14. The router of claim 11, wherein the behavior is predicted from at least a plurality of prior behaviors of the at least one network element.

15. The router of claim 14, wherein the behaviors include at least two of an action of the at least one network element, a performance of the at least one network element, and an accuracy of the at least one network element.

16. The router of claim 11, wherein the packet facilitates at least one of an audio communication and an image communication.

* * * * *